United States Patent [19]
Kurkjian, Jr.

[11] 3,958,314
[45] May 25, 1976

[54] SEAL FOR BUTTERFLY VALVES

[75] Inventor: Gregory A. Kurkjian, Jr., Wheaton, Ill.

[73] Assignee: Henry Pratt Company, Aurora, Ill.

[22] Filed: July 11, 1974

[21] Appl. No.: 487,434

Related U.S. Application Data

[62] Division of Ser. No. 363,885, May 25, 1973, abandoned.

[52] U.S. Cl. ............... 29/157.1 R; 29/156.7 A; 29/DIG. 3; 228/151; 251/306
[51] Int. Cl.² ............... B23P 15/00; F16K 1/226
[58] Field of Search ............ 29/157.1 R, 505, 475, 29/156.7 R, 156.7 A, DIG. 3; 251/305–308, 314–317, 367, 368, 171–173; 228/129, 151

[56] References Cited
UNITED STATES PATENTS

| | | | |
|---|---|---|---|
| 402,696 | 5/1889 | Strong | 29/168 |
| 2,574,509 | 11/1951 | Stuart | 29/505 |
| 2,907,548 | 10/1959 | Maas et al. | 251/173 |
| 3,276,739 | 10/1966 | Freed | 251/368 |
| 3,347,261 | 10/1967 | Yancey | 251/368 |
| 3,425,439 | 2/1969 | Duffey et al. | 251/308 |
| 3,447,781 | 6/1969 | Fawkes | 251/315 |
| 3,544,066 | 12/1970 | Fawkes | 251/306 |
| 3,749,359 | 7/1973 | Montesi | 251/306 |
| 3,787,960 | 1/1974 | Greenleaf | 228/151 |

*Primary Examiner*—C. W. Lanham
*Assistant Examiner*—Dan C. Crane
*Attorney, Agent, or Firm*—Wegner, Stellman, McCord, Wiles & Wood

[57] ABSTRACT

A new and improved butterfly valve, and particularly, an inexpensive seal therefor. A valve body having a fluid passage is provided with a flexible valve seat about the periphery of the passage, while a butterfly valve disc is journalled within the passage for movement between an open and closed position and includes an annular, radially outwardly extending, peripheral lip. The lip receives a C-shaped hoop which may be stamped, rolled or extruded from a corrosion resistant material for sealingly engaging the valve seat when the disc is in the closed position. Suitable sealing means may be interposed between the hoop and the valve disc. The use of such a hoop permits the construction of a more economical valve than those heretofore known.

7 Claims, 7 Drawing Figures

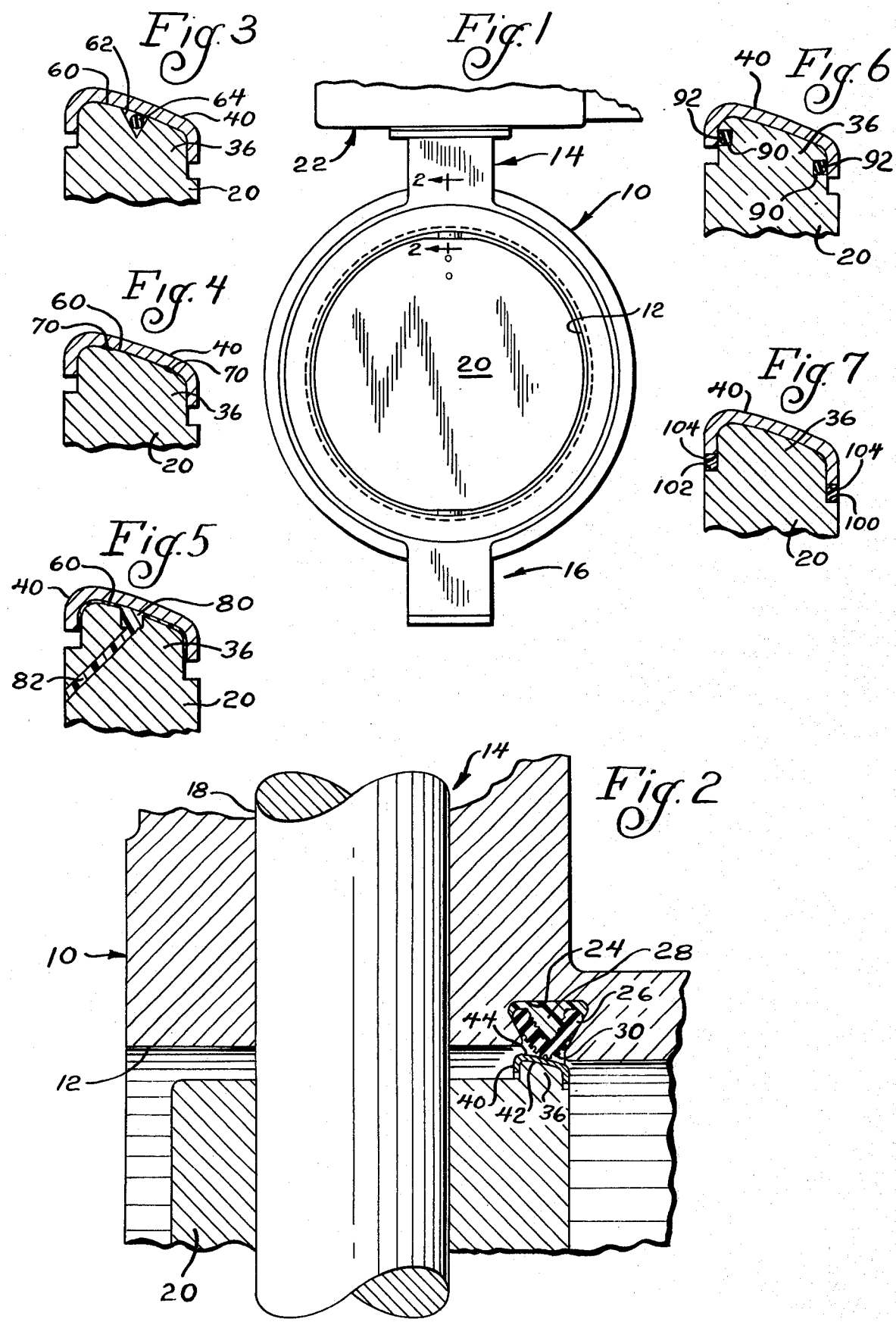

SEAL FOR BUTTERFLY VALVES

This is a division of application Ser. No. 363,885, filed May 25, 1973, now abandoned.

BACKGROUND OF THE INVENTION

This invention relates to valves and, more particularly, to valves of the type including a valve member journalled for rotation within a valve body through about 90° between open and closed positions as, for example, a butterfly valve; and an inexpensive structure whereby a positive, corrosion resistant seal may be obtained.

Economic considerations in the fabrication of rotary valves such as butterfly valves, ball valves, etc., have resulted in a variety of proposals of structures whereby a valve member, such as a valve disc in a butterfly valve, can provide a good seal when in a closed position within a valve body without requiring expensive machining operations on the valve member when the same is formed of an extremely hard material as, for example, cast iron. More particularly, it will be recognized that the sealing surface on a valve member must be smooth and continuous so as to insure a positive seal against the valve seat. Since cast iron does not possess extremely good corrosion resistant properties, the two problems of economical construction and corrosion resistance have been solved by securing a hoop of corrosion resistant material to the valve member, which hoop defines a sealing surface on the valve member itself.

This approach is exemplified in U.S. Pat. No. 3,144,040 to White, among others, and has been successful to the extent that a valve that is not easily deteriorated by corrosion and which can be fabricated at a lesser cost than a variety of other valves has resulted.

Nonetheless, this approach still requires machining operations on the stainless steep hoop employed or complicated forming operations to obtain a proper cross sectional shape for the hoop, or both.

SUMMARY OF THE INVENTION

It is the principal object of the invention to provide a new and improved rotary valve such as a butterfly valve, rectangular valve, or a ball valve, etc. More particularly, it is an object of the invention to provide an improved valve wherein a ring or hoop of corrosion resistant material is applied to the valve member to define a sealing surface on the valve member for engagement with a seat and which can be fabricated and applied to the valve member without the need for any machining of the corrosion resistant hoop and/or complicated forming of the same to obtain a desired shape.

The exemplary embodiment of the invention achieves the foregoing object by a construction including a hoop having a C-shaped cross section and being formed by stamping of a sheet of corrosion resistant material such as stainless steel. Alternately, the hoop may be formed inexpensively by rolling or extrusion. The concave, inner surface of the hoop is located to substantially tightly embrace a radially outwardly extending, annular, peripheral lip on a valve member such that the convex surface of the hoop may sealingly engage a resilient seal extending peripherally about the passage in a valve body. Preferably, a sealing means is interposed between the peripheral lip and the hoop so as to preclude fluid flow therebetween. A variety of different types of sealing means are also disclosed.

Other objects and advantages of the invention will become apparent from the following specification taken in conjunction with the accompanying drawings.

DESCRIPTION OF THE DRAWINGS

FIG. 1 illustrates a rotary valve, particularly a butterfly valve, embodying the invention;

FIG. 2 is an enlarged, fragmentary vertical section taken approximately along the line 2—2 of FIG. 1;

FIG. 3 is an enlarged, fragmentary vertical section of the invention showing one embodiment of a sealing means interposed between a hoop and the valve disc;

FIG. 4 illustrates a further embodiment of the sealing means;

FIG. 5 illustrates another embodiment of a sealing means;

FIG. 6 illustrates still another embodiment of a sealing means; and

FIG. 7 illustrates a further embodiment of a sealing means.

DESCRIPTION OF THE PREFERRED EMBODIMENTS

One type of a valve embodying the invention is illustrated in FIGS. 1 and 2 as a butterfly valve, which is seen to include a valve body 10 including a central fluid passage 12. Oppositely located on the body 10 are an upper journal 14 and a lower journal 16 for pivotally receiving trunnions 18 secured in diametrically opposite relation on the valve member in the form of a valve disc 20.

The upper journal 14 may have a hand or motor operated valve operator 22 mounted thereon whereby the upper trunnion 18 of the valve may be rotated in a conventional manner to move the valve disc 20 through about 90° between open and closed positions.

As best seen in FIG. 2, one side of the valve body 10 includes a recess 24 formed therein, which recess confronts the fluid passage. Received within the recess 24 is a valve seat 26 formed of relatively flexible material, usually rubber. The same is held in place by a body 28 of settable material, such as epoxy resin.

The lowermost tip 30 of the seat 26 serves as a sealing surface as will be seen.

The construction of the seat and manner of forming the same can be ascertained in greater detail by reference to U.S. Pat. No. 3,418,411 to Fawkes and assigned to the same assignee as the instant application.

Turning now to the valve disc 20, the same is normally formed of a hard material such as cast iron and on the side thereof which will underlie the seat 26 when the disc 20 is in a closed position as illustrated in FIG. 2, is an annular, peripheral, radially outwardly extending lip 36. Secured about the disc 20, and particularly about the lip 36, is a hoop 40 formed of a corrosion resistant material, preferably stainless steel. The hoop 40 is preferably formed to have a generally C-shaped cross section as by stamping out of sheet material, rolling or extruding. The same is secured in place such that its concave, radially inner surface 42 substantially embraces the lip 36 with the arms of the C in engagement with the sides of the lip 36. Normally, the hoop will be formed as a strip and then placed about the lip of the valve disc 20 in such a way that opposite ends abut. The abutting ends of the hoop 40 are then welded together and the weld smoothed by any suitable abrading means.

As illustrated in FIG. 2, the outermost surface 46 or convex surface, of the hoop is somewhat canted relative to the arms to engage the sealing surface 30 of the seat 26.

Because the valve disc 20 and the hoop 40 are formed of separate elements, it is necessary that means be provided for precluding the flow of fluid through their interface. While such could be accomplished by peripherally welding the hoop 40 to the valve disc 20, such is a rather time-consuming process and, accordingly, sealing means interposed between the hoop 40 and the lip 36 of the valve disc are provided.

With reference now to FIG. 3, a first form of sealing means will be described. The radially outer surface 60 of the lip 36 on the valve disc 20 is provided with an inwardly directed, generally V-shaped, peripheral groove 62. Before the hoop 40 is applied to the lip 36, a suitably dimensioned O-ring 64 is located in the groove 62. Preferably, the dimensions are such that the O-ring 64 will sealingly engage both a portion of the concave surface of the hoop 40 as well as the sides of the groove 62 to preclude fluid passage.

FIG. 4 illustrates a further embodiment of a sealing means. In the embodiment of FIG. 4, a flowable, settable, plastic sealant such as epoxy may be employed. In particular, the plastic is applied as two annular strips 70 extending about the entire periphery of the radially outer surface 60 of the lip 36 prior to the application of the hoop 40. Once the plastic has been applied, the hoop 40 may then be applied and secured. Thereafter, the plastic may be cured in any suitable fashion.

FIG. 5 illustrates still a further embodiment of a sealing means. In the case of the FIG. 5 embodiment, the radially outer surface 60 of the lip 36 is provided with an inwardly directed, peripheral groove 80 of a sufficient dimension so as to allow a flowable plastic material to flow about the periphery of the lip 36. At one or more locations, the disc is provided with ports in fluid communication with the groove 80 and an exterior surface of the valve disc 20. After the hoop 40 has been applied to the lip 36 and secured in place, a flowable, settable plastic sealant such as an epoxy resin, is introduced through the port 82 to flow about the entire periphery of the lip 36 to seal the interface of the hoop 40 and the valve disc 20 as illustrated in FIG. 5. After the plastic has been satisfactorily distributed, it may be cured in any suitable fashion.

Still another embodiment of a sealing means is illustrated in FIG. 6. According to this embodiment, annular grooves 90 are formed in the opposite sides of the lip 36 at such a location as to be overlapped by the arms of the C-shaped configuration defining the hoop 40. Suitably dimensioned O-rings 92 are disposed in the grooves 90 and, again, the O-rings are dimensioned such as to sealingly engage the surfaces of the grooves 90 as well as a portion of the confronting concave surface of the hoop 40. Naturally, according to this embodiment, the O-rings 92 are located in the grooves 90 before the hoop 40 is applied to the lip 36.

FIG. 7 illustrates still a further embodiment of the invention. According to the embodiment illustrated in FIG. 7, the length of the arms of the C-shaped configuration defining the hoop 40 is such as to terminate somewhat short of annular surfaces 100 and 102 on the valve disc defining the base of the lip 36. As a result, a recess exists and the same is filled with a flowable, settable plastic 104 which may then be cured to provide a seal. The hoop may be inexpensively fabricated or formed through relatively simple operations such as stamping out of a sheet of corrosion resistant material which may be conventional shelf stock. It may also be formed by a relatively simple rolling operation or can be extruded. In all such cases, expensive machining operations are avoided. Thus, it is to be understood that as used herein, the term "formed" with reference to the hoop 40 refers to one having a non-machined surface which is formed by stamping, rolling or extruding.

Such a hoop, quite unexpectedly, provides a reliable seal at a singificant lesser cost than can be attained through the use of prior art valves. Through the use of the invention, machining operations are eliminated in favor of relatively simple forming operations.

Moreover, welding operations are virtually eliminated, particularly for relatively small valve sizes, since once the hoop 40 is applied to the lip 36 and the ends of the form are welded together, no further welding need by employed except in relatively large valves. In relatively large valves some welding as, for example, a series of spaced tack welds may be necessary to insure that the hoop is securely fastened to the disc. In such large valves, the expected differences in the coefficients of expansion of the hoop and the disc may require such auxiliary securing.

I claim:

1. A method of fabricating a valve having a valve body provided with an opening through which fluid may pass, a valve member rotatable within the opening and positionable therein to control the flow of fluid therethrough; a peripheral lip on one of the valve member and the opening and a valve seat on the other of the valve member and the opening, comprising the steps of providing a valve body having a fluid flow opening; providing a valve member for rotatable disposition in said opening to control fluid flow; providing a peripheral lip on one, and a valve seat on the other of the valve member and the opening; forming a channel shaped strip having a concave surface out of corrosion resistant sheet material; placing the strip about the peripheral lip such that the lip enters the concave surface of the channel and with the ends of the strip in abutting relation; and thereafter securing the ends of the strip to each other.

2. The method of fabricating a valve according to claim 1 including the step of interposing a seal between the strip and the lip peripherally around the latter.

3. A method according to claim 1 wherein the lip is located on the valve member and the valve seat is disposed on the valve body within the opening thereof.

4. The method of claim 1 wherein the step of securing the ends of the strip to each other is performed by welding the ends of the strip together.

5. The method of claim 1 wherein the step of securing the ends of the strip to each other is followed by the step of smoothing the abutting ends of the strip.

6. The method of claim 1 wherein the step of securing the ends of the strip to each other is performed by welding and including the further step of smoothing the weld.

7. The method of forming a butterfly valve including the method of claim 1 and wherein the peripheral lip on one of the valve member and the opening extends generally transverse to the axis of the opening.

* * * * *